US010437455B2

(12) United States Patent
Bao et al.

(10) Patent No.: US 10,437,455 B2
(45) Date of Patent: Oct. 8, 2019

(54) METHOD AND APPARATUS FOR ACTIVATING APPLICATION FUNCTION BASED ON THE IDENTIFICATION OF TOUCH-BASED GESTURED INPUT

(71) Applicant: Alibaba Group Holding Limited, Grand Cayman (KY)

(72) Inventors: Feng Bao, Hangzhou (CN); Lili Zhang, Hangzhou (CN); Hang Chen, Hangzhou (CN); Yuhao He, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/179,592

(22) Filed: Jun. 10, 2016

(65) Prior Publication Data
US 2016/0364112 A1 Dec. 15, 2016

(30) Foreign Application Priority Data
Jun. 12, 2015 (CN) .......................... 2015 1 0320930

(51) Int. Cl.
*G06F 3/048* (2013.01)
*G06F 3/041* (2006.01)
(Continued)

(52) U.S. Cl.
CPC ........ *G06F 3/0488* (2013.01); *G06F 3/04883* (2013.01); *G06F 3/04886* (2013.01); *G06F 3/167* (2013.01); *G06F 9/48* (2013.01)

(58) Field of Classification Search
CPC ............. G06F 3/048; G06F 3/041; G06F 3/00
See application file for complete search history.

(56) References Cited

U.S. PATENT DOCUMENTS 8,773,374 B2 * 7/2014 Ibdah .................. G06F 3/04886
178/18.01
8,922,485 B1 * 12/2014 Lloyd ................... G06F 3/0487
345/156
(Continued)

FOREIGN PATENT DOCUMENTS

CN 103577029 A 2/2014
CN 103838487 A 6/2014
(Continued)

OTHER PUBLICATIONS

PCT Search Report and Written Opinion dated Sep. 21, 2016 for PCT Application No. PCT/US16/37007, 9 pages.
(Continued)

*Primary Examiner* — Hugo Molina
(74) *Attorney, Agent, or Firm* — Lee & Hayes, P.C.

(57) ABSTRACT

A method for activating an application function includes obtaining an activation instruction sent by a user within a blank space accessible to the user on an application interface and activating at least one application function according to the activation instruction. The method allows the user to send the activation instruction from within the blank space accessible to the user on the application interface and activate a corresponding application function, without the need of operating a preset function button as in existing technologies. The technical solution is not limited by application scenarios and has a higher flexibility thus facilitating a convenient and rapid activation of a corresponding function and improving the convenience for the user to use application functions.

13 Claims, 4 Drawing Sheets

(51) Int. Cl.
*G06F 3/0488* (2013.01)
*G06F 3/16* (2006.01)
*G06F 9/48* (2006.01)

(56) References Cited

U.S. PATENT DOCUMENTS

| | | | |
|---|---|---|---|
| 9,185,062 B1* | 11/2015 | Yang | H04L 51/046 |
| 2010/0083108 A1* | 4/2010 | Rider | G06F 3/04883 |
| | | | 715/702 |
| 2011/0057953 A1 | 3/2011 | Horodezky | |
| 2011/0273380 A1* | 11/2011 | Martin | G06F 3/04883 |
| | | | 345/173 |
| 2012/0302167 A1* | 11/2012 | Yun | G06F 3/04883 |
| | | | 455/41.2 |
| 2012/0306788 A1* | 12/2012 | Chen | G06F 3/0482 |
| | | | 345/173 |
| 2013/0227490 A1 | 8/2013 | Thorsander et al. | |
| 2014/0019896 A1 | 1/2014 | Satterfield | |
| 2014/0026098 A1 | 1/2014 | Gilman | |
| 2014/0040810 A1* | 2/2014 | Haliburton | G06F 3/017 |
| | | | 715/773 |
| 2014/0055552 A1 | 2/2014 | Song et al. | |
| 2014/0181749 A1 | 6/2014 | Takikawa | |
| 2014/0331168 A1* | 11/2014 | Wang | G06F 3/0482 |
| | | | 715/779 |
| 2015/0019963 A1* | 1/2015 | Park | G06F 9/453 |
| | | | 715/708 |
| 2015/0143244 A1 | 5/2015 | Koo et al. | |
| 2015/0153951 A1* | 6/2015 | Kim | G06F 3/0414 |
| | | | 715/773 |
| 2015/0277685 A1* | 10/2015 | Shieh | G06F 3/0412 |
| | | | 715/752 |
| 2015/0350147 A1* | 12/2015 | Shepherd | H04L 51/24 |
| | | | 715/752 |
| 2016/0018913 A1* | 1/2016 | Zhang | G06F 3/0488 |
| | | | 345/173 |
| 2016/0092095 A1 | 3/2016 | Fibaek | |

FOREIGN PATENT DOCUMENTS

| | | |
|---|---|---|
| CN | 103984486 A | 8/2014 |
| CN | 104182115 A | 12/2014 |
| CN | 104182166 A | 12/2014 |
| CN | 104252301 A | 12/2014 |
| WO | WO2014167570 | 10/2014 |

OTHER PUBLICATIONS

Translated Chinese Office Action dated Oct. 30, 2017 for Chinese Application No. 201510320930X, a corresponding foreign application of U.S. Appl. No. 15/179,592, 12 pages.
Translated Chinese Office Action dated Sep. 7, 2018 for Chinese Application No. 201510320930X, a corresponding foreign application of U.S. Appl. No. 15/179,592, 12 pages.
Chinese Search Report dated Oct. 18, 2017 for Chinese Application No. 201510320930X, a corresponding foreign application of U.S. Appl. No. 15/179,592, 2 pages.

* cited by examiner

FIG. 4

METHOD AND APPARATUS FOR ACTIVATING APPLICATION FUNCTION BASED ON THE IDENTIFICATION OF TOUCH-BASED GESTURED INPUT

CROSS REFERENCE TO RELATED PATENT APPLICATION

This application claims foreign priority to Chinese Patent Application No. 201510320930.X filed on Jun. 12, 2015, entitled "Method and Apparatus for Activating Application Function", which is hereby incorporated by reference in its entirety.

TECHNICAL FIELD

The present disclosure relates to the field of communication technologies, and in particular, to methods and apparatuses of activating an application function.

BACKGROUND

With the development of Internet technology, a variety of different applications have emerged. The applications provide support for a plurality of different functions, for example, receiving and sending information, QR code scanning, adding favorite items, setting, videoing, and communications, etc. Generally speaking, respective function buttons are set up on an interface of an application for commonly used functions to facilitate a user to activate corresponding functions through the function buttons. An instant messaging tool is used as an example. A text input button, a speech input button, an icon input button, etc., are set in a lower portion of a chat window of the instant messaging tool.

In a real application, a user needs to click a function button to activate a corresponding function. For example, in a chatting process, a user needs to click a microphone voice input icon at the bottom right corner of a chat window for voice input. However, due to restrictions in application scenarios, such as when driving or operating with single hand, the user may find it inconvenient to manipulate the voice input icon, thus failing to activate the corresponding function and affecting the usage of the application function by the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

According to multiple aspects, the present disclosure provides a method and an apparatus of activating an application function, to facilitate activation of an application function in a quick manner, and to improve the convenience for a user to use the application function.

According to an aspect of the present disclosure, a method of activating an application function is provided, which may include obtaining an activation instruction sent by a user within a blank space that is accessible to the user on an application interface; and activating at least one application function according to the activation instruction.

According to another aspect of the present disclosure, an apparatus of activating an application function is provided, which may include an acquisition module to obtain an activation instruction sent by a user within a blank space that is accessible to the user on an application interface; and an activation module to activate at least one application function according to the activation instruction.

As can be seen from the above technical schemes, the present disclosure allows a user to send an activation instruction within a blank space that is accessible to the user on an application interface to activate a corresponding application function, without the need of operating a preset function button as existing technologies do. The technical schemes of the present disclosure are not limited by application scenarios, and possess better flexibility, for example, when a user is driving or operating with one hand. Furthermore, a corresponding function is activated in a convenient and rapid manner, therefore improving the convenience for a user to use an application function.

BRIEF DESCRIPTION OF THE DRAWINGS

To describe the technical schemes in exemplary embodiments of the present disclosure more clearly, accompanying drawings used in description of the embodiments or existing technologies are briefly introduced herein. Apparently, the accompanying drawings merely represent a few embodiments of the present disclosure, and one of ordinary skill in the art may still derive other drawings from these accompanying drawings without making any creative effort.

DETAILED DESCRIPTION

In order to make the objectives, technical schemes and advantages of the present disclosure more clear, the technical schemes in the embodiments of the present disclosure are described clearly and completely hereinafter with reference to the accompanying drawings. Apparently, the described embodiments merely represent a portion of, and not all of, possible embodiments of the present disclosure. Based on the embodiments in the present disclosure, all other embodiments derived by one of ordinary skill in the art without making any creative effort shall fall within the scope of protection of the present disclosure.

Figure 1:
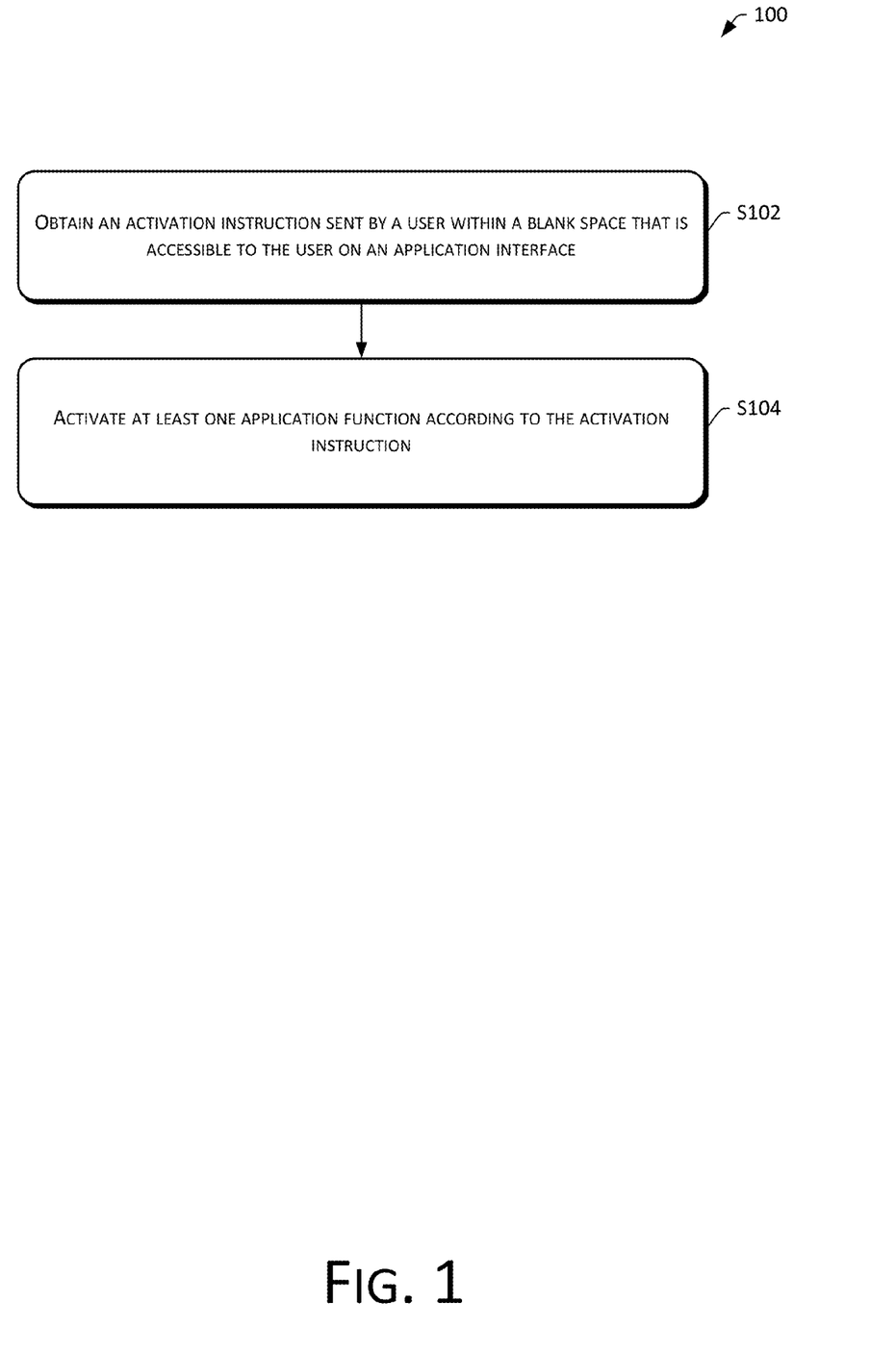
FIG. 1 is a flowchart illustrating a method for activating an application function activation according to an embodiment of the present disclosure.

FIG. 1 is a flowchart illustrating a method 100 for activating an application function activation according to an embodiment of the present disclosure. As shown in FIG. 1, the method 100 may include the following method blocks.

S102 obtains an activation instruction sent by a user within a blank space that is accessible to the user on an application interface.

S104 activates at least one application function according to the activation instruction.

The present embodiment provides a method for activating an application function, which may be implemented by an apparatus for activating an application function (which is referred hereinafter as an activation apparatus), to provide a convenient and rapid method for activating an application function to a user.

First, it is noted that the example method is applicable in a variety of different applications. For example, the example method may be used in an instant messaging application, a taxi-taking application, a music application, a game application, an e-commerce application, etc. Accordingly, an application function may be a function provided by a variety of applications.

For example, for an instant messaging application, an application function may include a voice input function, a text input function, a red envelope function, a file sending function, an image sending function, an image capturing function, an information sending function, etc.

For a ride-sharing application, an application function may include, for example, a reservation function, a voice input function, a text input function, a word bringing function, an order submission function, etc.

For a music application, an application function may include, for example, a search function, a discovery function, a playback function, a pause function, a song selection function, etc.

For an e-commerce application, an application function may include, for example, a add-to-shopping-cart function, an order submission function, an order inquiry function, a payment function, a transfer function, etc.

Regardless of which type the application is, a user needs to first open the application, and enters an application interface before using the application. According to differences in applications, content showed on respective application interfaces and styles of the application interfaces may also be different. Normally, function button(s) is/are set on an application interface, and the function button(s) correspond(s) to some application function(s), for facilitating a user to rapidly start the corresponding application function(s). In addition, an information region may further be provided on the application interface, which is used for displaying main information or used by the user for information exchange. Apparently, the application interface is not fully occupied, some blank spaces may usually exist. A blank space, as it is called, is referred to as a region other than regions occupied by various types of information that are showed on the application interface.

When a user needs to activate certain one or more application functions, the user may click corresponding function button(s) on the application interface to send activation instruction(s) so as to activate the corresponding application function(s). Besides, the example method provides another more flexible way of activation, i.e., sending an activation instruction by a user through a blank space that is accessible to the user on an application interface. An activation apparatus receives the activation instruction sent by the user inside the blank space accessible to the user on the application interface, and activates at least one application function according to the activation instruction.

The example method allows a user to send an activation instruction from within a blank space accessible to the user on an application interface to activate a corresponding application function, without the need of operating a preset function button as required in the existing technologies. The technical schemes of the present disclosure are not limited by application scenarios, and have a better flexibility, thus improving the convenience for a user to use an application function.

In a real application, after taking into account that layout positions of function buttons are set, a user may find it inconvenient to operate a function button in some situations, for example, when the user operates with one hand. For example, it is inconvenient to operate a function button on the right side of a screen when being operated by a left hand. By adopting the example method, the user may send an activation instruction from within a blank space accessible to the left hand without the need of operating a function button, thus conveniently and rapidly activating a desired application function while improving the convenience of using the application function. In some other implementations, the interface may also adaptively adjust elements or content layout of the interface according to a left/right-hand holding mode of the user. For example, in response to detecting that the user holds a mobile device with a left hand, the device may automatically compress content of the interface into a region on the right side of the screen, and reserve a larger amount of blank spaces on the left side of the screen to facilitate the user to activate corresponding functions in the blank spaces. Details of an implementation of detecting a left/right hand holding mode of a user by a mobile device can be referenced to a related existing technology. For example, a certain number of touch sensors may arranged on the back of a device, and whether a user holds the device with a left hand or a right hand may be determined based on a number of touches.

The example method is particularly applicable to activating application function(s) that is/are not able to be activated by a user via operation(s) of corresponding function button(s). In this type of scenario, activating at least one application function according to the activation instruction mainly refers to activating an application function corresponding to at least one function button located outside a range of operation accessible to the user on the application interface according to the activation instruction. The at least one function button outside the range of operation accessible to the user refers to function button(s) that is/are not able to be operated by the user. For example in case when the user operates with a left hand, this mainly refers to function button(s) that cannot be touched by the left hand of the user, and mainly includes button(s) on the right side of the screen.

It is noted that the present embodiment is particularly applicable to activating application functions that cannot be activated by a user via operations of corresponding function buttons, but is not limited thereto. Application functions that can be activated by a user via operations of corresponding function buttons may also be activated using the method provided in the present embodiment.

Optionally, in implementations, an activation gesture for activating a specified application function may be configured in advance, and information of the activation gesture is stored in the activation apparatus. When an activation instruction needs to be sent from within a blank space accessible to a user on an application interface to activate a corresponding application function, the user may perform a preconfigured activation gesture within the blank space accessible to the user. On this basis, a way of obtaining an activation instruction sent by a user within a blank space accessible to the user on an application interface may include obtaining a first operation gesture sent by a user within a blank space accessible to the user on an application interface; and converting the first operation gesture into an activation instruction in response to the first operation gesture being matched with a preset activation gesture. In implementations, the activation apparatus may monitor whether a user sends a first operation gesture within a blank space on an application interface in real time, and compare the first operation gesture with preset activation gesture(s) in response to detecting the first operation gesture sent by the user. If the first operation gesture is matched with a preset activation gesture, the activation apparatus may determine that the purpose of the user's sending the first operation gesture is to activate a specified application function, and thus convert the first operation gesture into a corresponding activation instruction to facilitate activating at least one application function according to the activation instruction.

In implementations, the first operation gesture may include at least one of a long-press gesture, a clicking gesture or a swiping gesture. The swiping gesture may include, for example, a swiping in an arc trajectory of a certain length using a thumb, but is not limited thereto.

It is noted that the first operation gesture in the present embodiment needs to be designed differently from gestures in existing technologies in order not to conflict with the gestures in existing uses. For example, long-press gestures can be distinguished through time lengths of respective long presses. Clicking gestures may be distinguished through respective click strengths, click frequencies, etc. Swiping gestures may be distinguished through respective angles of swiping trajectories.

Furthermore, when at least two application functions are activated through a long-press gesture, which application function is activated by the long-press gesture may be determined through a time length of an associated long press of the long-press gesture.

For example, at least one application function may include a first application function and a second application function. In implementations, the first application function and the second application function may be similar functions, which may be a voice input function and a video input function in an instant messaging application, for example. When the first operation gesture is a long-press gesture, activating at least one application function according to the activation instruction may include activating the first application function in the at least one application function if a time period of a long press of the long-press gesture is greater than a first time threshold and less than or equal to a second time threshold; and activating the second application function in the at least one application function if the time period of the long press time of the long press gesture is greater than the second time threshold.

Furthermore, for the video input function and the video input function in the instant messaging application, the long-press gesture may be maintained until an associated input is completed during a voice or video input process. In this type of application scenario, when a time period during which a user presses an accessible blank space on an application interface is greater than the first time threshold and less than or equal to the second time threshold, the user may perform a voice input within the time period. When the time period during which the user presses the accessible blank space on the application interface is greater than the second time threshold, the user may perform a video input in the subsequent time period. This approach allows the user perform inputs in sections, thereby providing a novel application mode.

It is noted that the first time threshold and the second time threshold may be adaptively configured according to application needs. For example, the first time threshold may be set as three seconds, the second time threshold may be set as five seconds, which are not limited herein.

In the foregoing implementations, a user may activate corresponding application functions through various types of operation gestures within a blank space accessible to the user on an application interface. Implementations thereof are simpler, having a better user operation flexibility, a higher implementation efficiency and a lower implementation cost while facilitating activation of an application function by a user. However, activating a corresponding application function via an operation gesture is not the only implementation method, and the present disclosure is also applicable to any implementation methods that allow a user to activate a corresponding application function from within a blank space accessible to the user on an application interface. For example, another implementation method is given as follows.

Optionally, in another implementation, obtaining the activation instruction sent by the user within the blank space that is accessible by the user on the application interface may include determining the blank space that is accessible to the user according to a second operation gesture sent by the user on the application interface; displaying a function button corresponding to the at least one application function to the user within the blank space accessible to the user; and receiving the activation instruction sent by the user by operating the function button within the blank space accessible to the user.

In the foregoing implementation, the user needs to submit an operation gesture, and determines a blank space accessible to the user through the operation gesture. For example, in an event that the user operates with a left hand, a thumb thereof may swipe from up to down to form an arc trajectory, and a blank space within a coverage range of the arc trajectory is a blank space that is accessible to the user. The activation apparatus receives the operation gesture sent by the user, determines the blank space accessible to the user based on the operation gesture, and displays a corresponding function buttons to the user within the blank space accessible to the user, for example, displaying a microphone button corresponding to a voice input function, a keyboard icon button corresponding to a text input function, etc. Since these function buttons are displayed within the blank space accessible to the user, the user is able to operate these function buttons conveniently. Thus, the user can determine an application function to be activated, and sends an activation instruction through a corresponding function button displayed within the blank space accessible to the user. In this implementation, the function button within the blank space accessible to the user may not affect an original function button, and the function button within the blank space accessible to the user may be implemented by directly copying the existing function button. As such, implementations thereof are simpler, having a better user operation flexibility, a higher implementation efficiency and a lower implementation cost while facilitating activation of an application function by a user.

Furthermore, after activating at least one application function according to the activation instruction, the user may use the application function. The user may also send a closing instruction to request the at least one activated application function to be closed after the user uses the application function. On such basis, after activating the at least one application function according to the activation instruction, the activation apparatus may also receive a closing instruction sent by the user, and close the at least one activated application function according to the closing instruction.

It is noted that present embodiment does not define a way of sending a closing instruction by a user, which depends on details of an activated application function, because the activated application function may affect the manner of sending the closing instruction by the user.

For example, for an application function having no independent interface or window, a user may send a closing instruction within a blank space accessible to the user on an application interface. For example, the user may send a closing instruction through a certain operation gesture. When the user sends the closing instruction through the operation gesture and an activation instruction is sent via the operation gesture, the operation gesture for sending the closing instruction needs to be distinguished from the operation gesture for sending the activation instruction.

For example, for the application function having an independent interface or window, a user may send an instruction for closing the application function through the interface or window possessed by the application function. For example, the interface or window possessed by the application function may be provided with a closing button, and the user may send a closing instruction via the closing button, or the user may send the closing instruction by means of a particular operation gesture on the interface or window possessed by the application function.

In implementations, after activating the at least one application function according to the activation instruction, the activation apparatus may output first prompt information to indicate that the at least one application function has been activated. The first prompt information may be any information that has a prompting function, for example, at least one of audio information, text information, and vibration and prompt light flashing information.

In implementations, after closing the activated at least one application function according to the closing instruction, the activation apparatus may also output second prompt information to indicate that the at least one activated application function has been closed. The second prompt information may be any information that has a prompting function, for example, at least one of audio information, text information or vibration and prompt light flashing information.

In implementations, after the at least one application function is activated according to the activation instruction, an operation interface corresponding to the at least one activated application function may be displayed to the user, and execution information of the at least one application function may be displayed on the operation interface. Displaying an operation interface of an activated application function and displaying execution information of the activated application function on the operation interface facilitate a user to understand an execution process of the application function and the progress of execution, and facilitates discovering execution errors in a timely manner, etc.

In implementations, the user may further be able to preview data in an execution process through the operation interface of the activated application function. In implementations, the user may send a preview instruction via the operation interface. In response to receiving the preview instruction sent by the user via the operation interface, the activation apparatus treats and outputs data of the at least activated one application function in an execution process as preview data according to the preview instruction, for allowing the user to preview. It is noted that preview data may take different forms according to different application functions, which may include a textual form, an audio form, etc., so that approaches in which the activation apparatus may output the preview data may be different.

For example, if the activated application function is a voice input function in an instant messaging application, a black layer interface may be used to mask an application interface to serve as an operation interface of the voice input function in order to give a visual impact to the user, which the present disclosure, however, not limited thereto.

In implementations, when the activated application is a voice input function, an audio map and quit prompt information may be displayed on an operation interface thereof to bring a visual effect to the user. The audio map reflects frequenc(ies) and amplitude(s) of voice(s) inputted by the user. The quit prompt information is used to prompt the user an operation approach to abandon this voice input. For example, the audio map may be displayed at the upper part of the operation interface, and the quit prompt information may be displayed at the lower part of the operation interface. The quit prompt information may include words like "swipe down to cancel sending".

Figure 2:
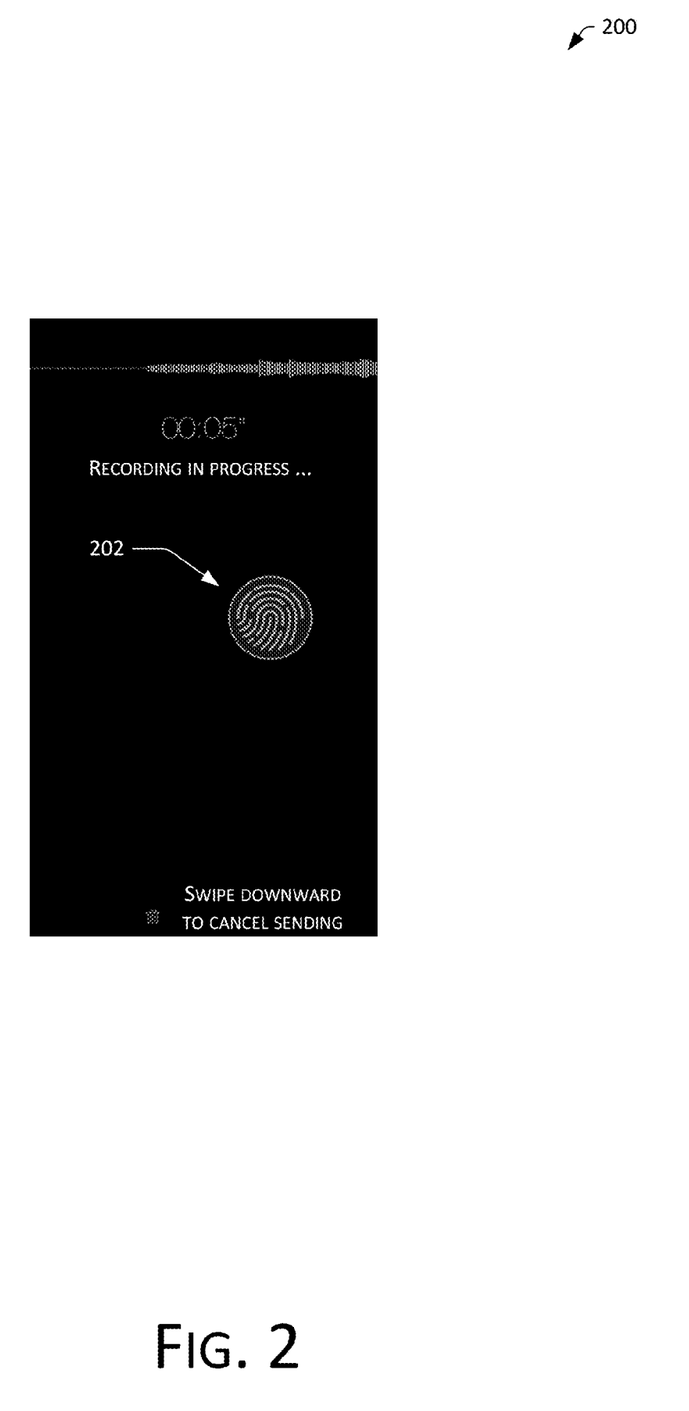
FIG. 2 is schematic diagram illustrating an operation interface of a voice input function according to an embodiment of the present disclosure.

Furthermore, finger(s) of the user may keep pressing all the time during a voice input process. Fingerprint bright spot(s) may be presented under the finger(s) of the user, and the fingerprint bright spot(s) may move along with the finger(s) of the user. In this way, a visual effect may be brought to the user. In view of this, the user may move a finger to a specified location to send a preview instruction. The activation apparatus plays a recorded voice according to the preview instruction, which is sent to the other party after the user confirms with "ok", thereby facilitating an improvement in the user experience. FIG. 2 shows a schematic diagram of an operation interface 200 of a voice input function. In FIG. 2, a finger of a user is not shown, but a fingerprint bright spot 202 under the finger of the user is shown directly.

In an instant messaging application, the application interface is a chat interface or a chat window in an instant messaging tool. The chat interface or the chat window may be a single chat interface, or a group chat interface. A larger range of blank space is provided in the chat interface, which is more convenient for the user to send the activation instruction, and facilitates a convenient and rapid activation of any function by the user.

It is noted that the example method is able to activate not only a voice input function, but also at least one of a dialogue conducting function, a video calling function, a telephone dialing function or a DING message sending function, etc. A DING message is a mandatory way of information reminding. A DING message sent by a sender may be notified to a receiver through a free telephone call, to allow the other party to respond immediately. If the receiver does not answer the phone, a free short message may be further pushed to the receiver.

It is noted that, each of the foregoing method embodiments is expressed as a sequence of action combinations for the ease of description. One skilled in the art should understand that the present disclosure is not limited by the described sequence of actions because some actions may be performed in another order or in parallel according to the present disclosure. Furthermore, one skilled in the art should also understand that the embodiments described in the specification all belong to exemplary embodiments, and actions and modules that are involved may not necessary for the present disclosure.

In the foregoing embodiments, emphases of descriptions of the embodiments are different, and a portion that is not described in detail in a certain embodiment may be referenced to a relevant description of other embodiments.

Figure 3:
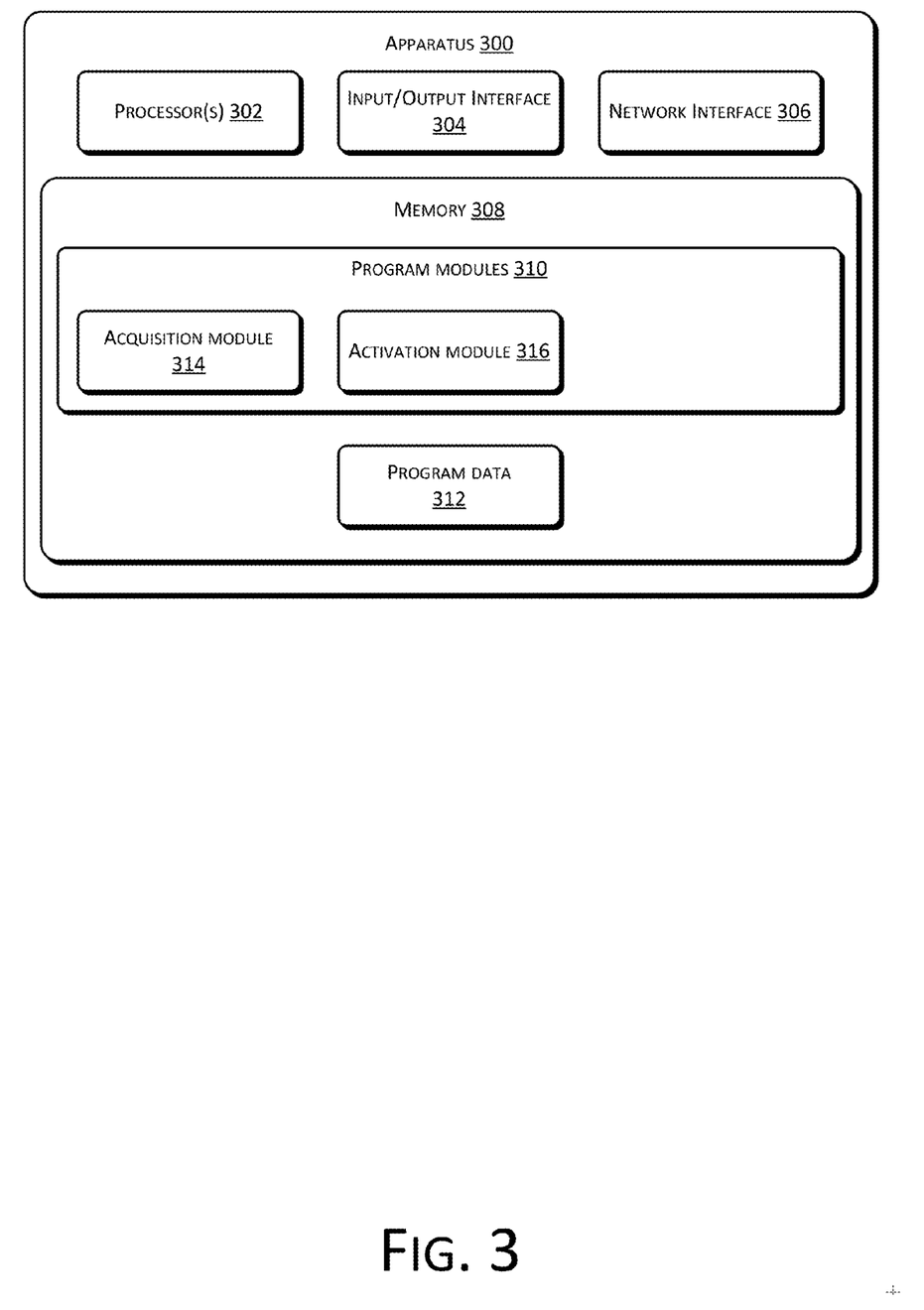
FIG. 3 is a structural diagram illustrating an apparatus for activating an application function according to an embodiment of the present disclosure.

FIG. 3 is a structural diagram illustrating an apparatus 300 for activating an application function according to an embodiment of the present disclosure. As shown in FIG. 3, the apparatus 300 may include one or more computing devices. In implementations, the apparatus 300 may include one or more processors 302, an input/output (I/O) interface 304, a network interface 306 and memory 308.

The memory 308 may include a form of computer-readable media, e.g., a non-permanent storage device, random-access memory (RAM) and/or a nonvolatile internal storage, such as read-only memory (ROM) or flash RAM. The memory 308 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 308 may include program modules 310 and program data 312. The program modules 310 may include an acquisition module 314 and an activation module 316. In implementations, the acquisition module 314 may obtain an activation instruction sent by a user within a blank space accessible to the user on an application interface. In implementations, the activation module 316 may activate at least one application function according to the activation instruction that is obtained by the acquisition module 314.

In implementations, the acquisition module 314 may further obtain a first operation gesture sent by the user within the blank space accessible to the user on the application interface, and convert the first gesture operation into the activation instruction in response to the first operation gesture being matched with a preset activation gesture.

In implementations, the first operation gesture may include at least one of a long-press gesture, a click gesture or a swipe gesture.

In implementations, when the first operation gesture is a long-press gesture, the activation module 316 may further activate a first application function of the at least one application function in response to a time period of an associated long press of the long-press gesture being greater than a first time threshold and less than or equal to a second time threshold, and activate a second application function of the at least one application function in response to the time period of the long press of the long-press gesture being greater than the second time threshold.

In implementations, the acquisition module 314 may further determine the blank space accessible to the user according to a second operation gesture sent by the user on the application interface, display a function button corresponding to the at least one application function to the user within the blank space accessible to the user, and receive the activation instruction sent by the user via an operation of the function button within the blank space accessible to the user.

In implementations, the activation module 316 may further activate an application function corresponding to at least one function button located outside an operation range accessible to the user on the application interface according to the activation instruction.

Figure 4:
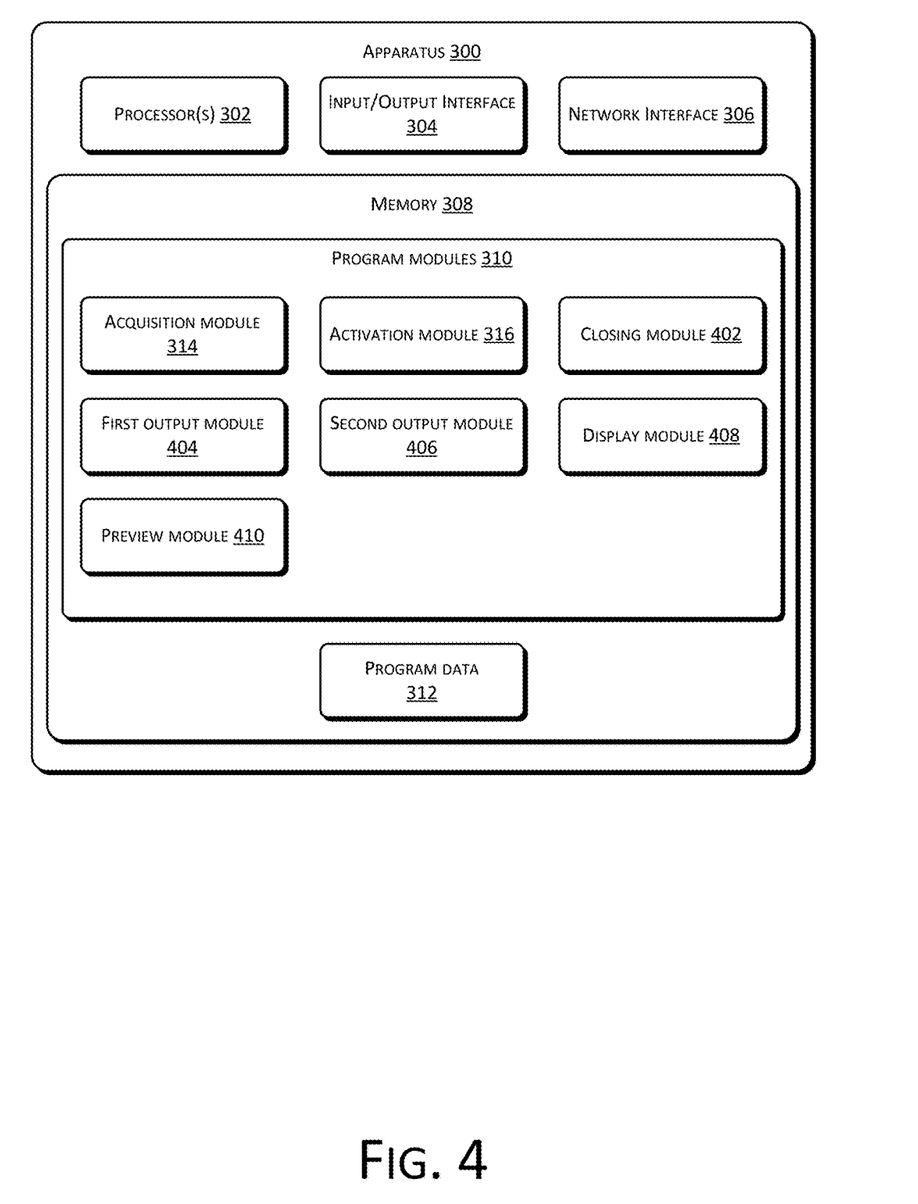
FIG. 4 is a structural diagram illustrating an apparatus for activating an application function according to another embodiment of the present disclosure.

In implementations, the activation apparatus 300 may further include a closing module 402, as shown in FIG. 4.

In implementations, the closing module 402 may receive a closing instruction sent by the user, and close the at least one application function according to the closing instruction.

In implementations, as shown in FIG. 4, the activation apparatus 300 may further include a first output module 404. The first output module 404 may output first prompt information to indicate that the at least one application function is activated after the activation module 316 activates the at least one application function according to the activation instruction.

In implementations, as shown in FIG. 4, the activation apparatus 300 may further include a second output module 406. The second output module 406 may output second prompt information to indicate that the at least one application function is closed after the closing module 402 closes the at least one application function according to the closing instruction.

In implementations, as shown in FIG. 4, the activation apparatus 300 may further include a display module 408. The display module 408 may display an operation interface corresponding to the at least one application function to the user, and display execution information of the at least one application function on the operation interface of the at least one application function.

In implementations, as shown in FIG. 4, the activation apparatus 300 may further include a preview module 410. The preview module 410 may receive a preview instruction sent by the user on the operation interface, take and output data of the at least one application function during an execution process as preview data according to the preview instruction.

Furthermore, the display module 408 may display an audio map and quit prompt information on the operation interface when at least one application is a voice input function, where the audio map reflects frequenc(ies) and amplitude(s) of voice(s) inputted by the user, and the quit prompt information is used to prompt the user an operation manner of abandoning the voice input.

In implementations, the above at least one application function may include at least one of a voice input function, a real-time dialogue function, a video calling function, a telephone dialing function or a DING message sending function.

In implementations, the application interface may be a chat interface in an instant messaging tool.

The application function activation apparatus 300 provided by the embodiments of the present disclosure may be implemented as functional modules in a variety of different applications, or be implemented independent of the applications and is able to communicate with the applications.

The application function activation apparatus 300 provided by the embodiments of the present disclosure allows a user to send an activation instruction within a blank space accessible to the user on an application interface to activate a corresponding application function, without the need of operating a preset function button as existing technologies do. By adopting the application function activation apparatus provided by the embodiments of the present disclosure, activating an application function is no longer limited by application scenarios, thus having a better flexibility. For example, when a user is driving or operating with one hand, a corresponding function can still be conveniently and rapidly activated, thereby improving the convenience for a user to use an application function.

One skilled in the art should understand that a detailed working process of the foregoing systems, apparatuses and units may be referenced to a corresponding process in the foregoing method embodiments, and are not redundantly described herein, for the sake of ease and brevity of description.

In the embodiments provided in the present disclosure, it should be understood that the disclosed systems, apparatuses, and methods may be implemented in other manners. For example, the foregoing apparatus embodiments are merely exemplary. For example, a division of the foregoing units is merely a division of logical functions, and other ways of division may exist in real implementations. By way of example, a plurality of units or components may be combined or integrated into another system, or some features may be ignored or not performed. In addition, the mutual coupling or direct coupling or communication connection that is shown or discussed may be indirect coupling or communication connection via some interfaces, devices or units, which may be implemented in electrical, mechanical or other forms.

The units described as separate components may be or may not be physically separate from each other, and components displayed as units may be or may not be physical units, i.e., may be located in a single location, or may be distributed among a plurality of network units. A portion or all of the units may be selected according to actual needs to achieve the objectives of the schemes of the exemplary embodiments.

In addition, functional units in the embodiments of the present disclosure may be integrated into a single processing unit. Alternatively, each of the units may exist as an independent physical entity. Alternatively, one or more units may be integrated into a single unit. The above integrated unit may be implemented in a form of hardware, or may be implemented in a form of hardware in combination with software functional units.

The integrated unit that is implemented in the form of a software functional unit may be stored in computer-readable storage media. The software functional unit is stored in storage media, and includes instructions for instructing a computing device (which may be a personal computer, a server, or a network device, etc.) or a processor to perform a portion of actions in the methods described in the embodiments of the present disclosure. The storage media may include a variety of media that are able to store program codes, such as a USB flash drive, a removable hard disk, a Read-Only Memory (ROM), a Random Access Memory (RAM), a magnetic disk, or an optical disc, etc.

Finally it is noted that the foregoing embodiments are merely given for illustrating, rather than limiting, the technical solutions of the present disclosure. Although the present disclosure is described in detail with reference to the foregoing embodiments, one of ordinary skill in the art should understand that modifications to the technical solutions disclosed in the aforementioned embodiments or an equivalent replacement of a part of technical features therein may also be made, without causing the essence of the corresponding technical solutions to depart from the spirit and scope of the technical solutions of the embodiments of the present disclosure.

What is claimed is:

1. A method implemented by one or more computing devices, the method comprising:
   obtaining an activation instruction sent by a user within a blank space accessible to the user on an application interface, the activation instruction including performing a long-press gesture operation and maintaining the long-press gesture operation until an application function is completed, wherein obtaining the activation instruction comprises converting the long-press gesture operation into the activation instruction in response to the long-press gesture operation being matched with a preset activation gesture;
   activating at least one application function according to the activation instruction, the activating including activating an application function corresponding to at least one function button that is located outside an operation range accessible to the user on the application interface, wherein activating the at least one application function comprises activating a first application function of the at least one application function in response to a time period of an associated long press of the long-press gesture is greater than a first time threshold and less than or equal to a second time threshold and activating a second application function of the at least one application function in response to the time period of the associated long press of the long-press gesture is greater than the second time threshold;
   receiving a closing instruction sent by the user within the blank space accessible to the user to close an activated application function; and
   closing the activated application function according to the closing instruction.

2. The method of claim 1, wherein the method further comprises:
   determining the blank space accessible to the user according to the long-press gesture operation sent by the user on the application interface;
   displaying a function button corresponding to the at least one application function to the user within the blank space accessible to the user; and
   receiving the activation instruction sent by the user via an operation of the function button within the blank space accessible to the user.

3. The method of claim 1, further comprising outputting first prompt information to indicate that the at least one application function is activated after the activating at least one application function according to the activation instruction.

4. The method of claim 3, further comprising outputting second prompt information to indicate that the at least one application function is closed after closing the at least one application function according to the closing instruction.

5. The method of claim 1, further comprising: displaying an operation interface of the at least one application function to the user after activating the at least one application function according to the activation instruction; and displaying execution information of the at least one application function on the operation interface of the at least one application function.

6. The method of claim 5, further comprising: receiving a preview instruction sent by the user on the operation interface of the at least one application function; and outputting data in a course of executing the at least one application function as preview data according to the preview instruction.

7. The method of claim 5, wherein displaying the execution information of the at least one application function comprises displaying an audio map and quit prompt information on the operation interface of the at least one application function, wherein the audio map reflects a frequency and an amplitude of a voice inputted by the user, and the quit prompt information is used to prompt the user to abandon a voice input when the at least one application function is a voice input function.

8. An apparatus, comprising:
one or more processors;
memory;
an acquisition module stored in the memory and executable by the one or more processors to obtain an activation instruction sent by a user within a blank space accessible to the user on an application interface, wherein the activation instruction including performing a long-press gesture operation and maintaining the long-press gesture operation until an application function is completed, and convert the long-press gesture operation into the activation instruction in response to the long-press gesture operation being matched with a preset activation gesture;
an activation module stored in the memory and executable by the one or more processors to activate at least one application function according to the activation instruction, wherein activating at least one application function includes activating an application function corresponding to at least one function button that is located outside an operation range accessible to the user on the application interface, and wherein activate the at least one application function comprises activating a first application function of the at least one application function in response to a time period of an associated long press of the long-press gesture is greater than a first time threshold and less than or equal to a second time threshold and activating a second application function of the at least one application function in response to the time period of the associated long press of the long-press gesture is greater than the second time threshold; and
a closing module stored in the memory and executable by the one or more processors to receive a closing instruction sent by the user within the blank space accessible to the user and to close an activated application function according to the closing instruction.

9. The apparatus of claim 8, wherein the acquisition module further determines the blank space accessible to the user according to the long-press gesture operation sent by the user on the application interface, displays a function button corresponding to the at least one application function to the user within the blank space accessible to the user, and receives the activation instruction sent by the user via an operation of the function button within the blank space accessible to the user.

10. The apparatus of claim 9, further comprising:
a first output module stored in the memory and executable by the one or more processors to output first prompt information to indicate that the at least one application function is activated; and
a second output module stored in the memory and executable by the one or more processors to output second prompt information to indicate that the activated application function is closed.

11. The apparatus of claim 9, further comprising:
a display module stored in the memory and executable by the one or more processors to display an operation interface of the at least one application function to the user, and display execution information of the at least one application function on the operation interface of the at least one application function; and
a preview module stored in the memory and executable by the one or more processors to receive a preview instruction sent by the user on the operation interface of the at least one application function, and take and output data in a course of executing the at least one application function as preview data according to the preview instruction.

12. One or more non-transitory computer-readable media storing executable instructions that, when executed by one or more processors, cause the one or more processors to perform acts comprising:
obtaining an activation instruction sent by a user within a blank space accessible to the user on an application interface, the activation instruction including performing a long-press gesture operation and maintaining the long-press gesture operation until an application function is completed, wherein obtaining the activation instruction comprises converting the long-press gesture operation into the activation instruction in response to the long-press gesture operation being matched with a preset activation gesture;
activating at least one application function according to the activation instruction, the activating including activating an application function corresponding to at least one function button that is located outside an operation range accessible to the user on the application interface, wherein activating the at least one application function comprises activating a first application function of the at least one application function in response to a time period of an associated long press of the long-press gesture is greater than a first time threshold and less than or equal to a second time threshold and activating a second application function of the at least one application function in response to the time period of the associated long press of the long-press gesture is greater than the second time threshold;
receiving a closing instruction sent by the user within the blank space accessible to the user to close an activated application function; and
closing the activated application function according to the closing instruction.

13. One or more non-transitory computer-readable media storing executable instructions that, when executed by one or more processors, cause the one or more processors to perform acts comprising:
displaying, in an instant messaging (IM) chat window, at least a first IM message and a second IM message exchanged between at least a first party and a second party, wherein the first IM message and the second IM message defines a blank area accessible to the user among the messages;
activating a voice recording function, in response to a user operation on the blank area accessible to the user, to allow voice messages to be recorded and transmitted between the first party and the second party, the user operation including performing a long-press gesture operation and maintaining the long-press gesture operation until the activated voice recording function is completed and the voice recording function being located outside an operate range accessible to the user on the IM chat window;

converting the long-press gesture operation into an activation instruction in response to the long-press gesture operation being matched with a preset activation gesture;

activating a first application function of the voice recording function in response to a time period of an associated long press of the long-press gesture is greater than a first time threshold and less than or equal to a second time threshold;

activating a second application function of the voice recording function in response to the time period of the associated long press of the long-press gesture is greater than the second time threshold;

displaying an audio map on the IM chat window;

receiving, in the IM chat window, closing instructions sent by the user within the blank area accessible to the user to close the voice recording function; and closing the activated voice recording function according to the closing instruction.

\* \* \* \* \*